United States Patent [19]

Closs et al.

[11] Patent Number: 5,393,626

[45] Date of Patent: Feb. 28, 1995

[54] INCREASING PHOTOCONDUCTIVITY BY ADJUSTING THE DISCOTIC PHASE

[75] Inventors: Friedrich Closs, Ludwigshafen; Thomas Frey, Muenster; Dirk Funhoff, Heidelberg; Karl Siemensmeyer, Frankenthal; Helmut Ringsdorf, Mainz-Gonsenheim; Dietrich Haarer, Bayreuth; Peter Strohriegl, Hummeltal, all of Germany

[73] Assignee: BASF Aktiengesellschaft, Ludwigshafen, Germany

[21] Appl. No.: 167,066

[22] Filed: Dec. 16, 1993

Related U.S. Application Data

[62] Division of Ser. No. 924,494, Aug. 4, 1992, abandoned.

[30] Foreign Application Priority Data

Aug. 10, 1991 [DE] Germany .............................. 4126496

[51] Int. Cl.$^6$ .................................................. G03G 5/06
[52] U.S. Cl. ........................................... 430/56; 430/83
[58] Field of Search ...................... 430/20, 56, 57, 58, 430/72, 83; 359/99, 102, 103, 106

[56] References Cited

U.S. PATENT DOCUMENTS 4,980,081 12/1990 Ringsdorf et al. .............. 252/299.01
5,141,785 8/1992 Yoshinada et al. ..................... 428/1

Primary Examiner—John Goodrow
Attorney, Agent, or Firm—Keil & Weinkauf

[57] ABSTRACT

The present invention relates to photoconductors composed of low molecular weight or polymeric organic compounds with liquid crystal properties, where the photoconduction in the discotic phase is higher than in the non-liquid-crystal phases, and to a method for increasing the photoconductivity by molecular ordering in photoconductors.

5 Claims, No Drawings

INCREASING PHOTOCONDUCTIVITY BY ADJUSTING THE DISCOTIC PHASE

This is a division of application Ser. No. 07/924,494, filed Aug. 4, 1992, now abandoned.

The present invention relates to photoconductors composed of low molecular weight or polymeric organic compounds with liquid crystal properties. The present invention particularly relates to organic photoconductors of these types which have liquid crystal properties and which have an increased photoconductivity in the liquid crystal state. The present invention additionally relates to a method for increasing the photoconduction by molecular ordering, in which the photoconductivity is increased in ordered liquid crystal systems. The terms "state" and "phase" are used interchangeably hereinafter.

Photoconducting polymers are an interesting class of materials and are used widely in industry in photocopiers, laser printers and offset printing plates.

Several attempts to improve the charge-transport properties of liquid crystal materials by orientation in the liquid crystal state have been disclosed. There are two approaches to this.

On the one hand, lower molecular weight liquid crystals which form nematic phases at room temperature are doped with carbazole. However, the uptake capacity for this of the liquid crystal matrix is very limited. Even at very low concentrations (a few % by weight) the carbazole begins to crystallize. Accordingly, there is only a low photocurrent in the liquid crystal samples doped with carbazole (cf. L. L. Chapoy, D. K. Munck, K. H. Rasmussen, E. Juul-Diekmann, R. K. Sethi, D. Biddle, in Molecular Crystals, Liquid Crystals, 105 (1984) 353).

The second approach is illustrated in EP-A 254 060. This discloses photoconducting films which have a thickness of less than 20 μm and are prepared from concentrated lyophasic solutions of a polymer which has repeating units of the formula I

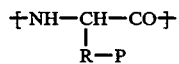

where R is alkylene of 1 to 20 carbons, and P is a photoconducting group.

It is an object of the present invention to provide organic photoconductors which have liquid crystal properties and which have a higher photoconductivity in the liquid crystal state than in the non-liquid-crystal state.

We have found that this object is achieved by liquid crystal photoconductors with discotic properties.

The present invention therefore relates to low molecular weight or polymeric organic photoconductors which have discotic properties and which have an increased photoconductivity in the discotic phase.

Examples of low molecular weight organic liquid crystal photoconductors with discotic properties according to the invention are triphenylene and its derivatives, of which the alkoxy-substituted triphenylene derivatives are preferred, phthalocyanines, hexasubstituted benzenes and truxenes.

Polymeric organic photoconductors according to the invention are those which contain photoconducting groups in the polymer chain or bonded via a flexible spacer to a polymer chain. Examples of these are the polysiloxanes described in US-A 4,865,762, or the polymers (A-1) to (A-5):

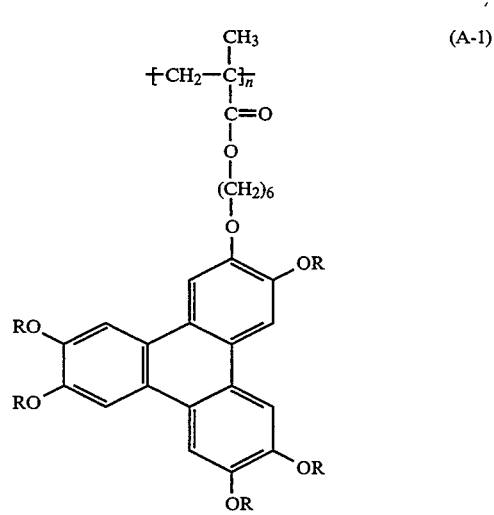

where R is n-pentyl;

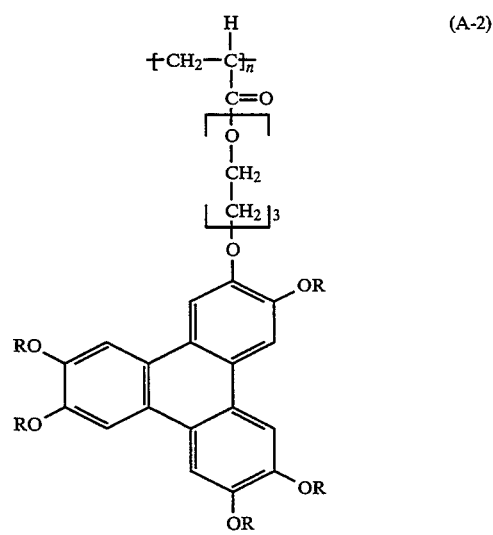

where R is 3,6-dioxa- 1-heptyl; and (A-3), (A-4) and (A-5)

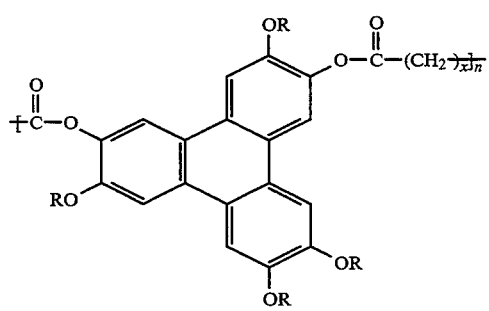

where x has the following values:
10 for (A-3),
14 for (A-4) and
20 for (A-5);

and where R in the polymers (A-3), (A-4) and (A-5) is n-pentyl.

It is possible to add sensitizers, i.e. compounds which generate charge carriers, to increase the photosensitivity of the layers. Examples of compounds of this type are the perylenetetracarboxylic acid derivatives disclosed in DE-A 22 37 539 and DE-A 31 10 955. It is particularly preferred to add liquid crystal compounds as generators of charge carriers.

It is likewise possible to form charge-transfer complexes for generating charge carriers.

It is possible according to the invention for the low molecular weight or polymeric organic compounds with liquid crystal properties to act as electron donors or as electron acceptors in the charge-transfer complexes. As a rule, the said low molecular weight or polymeric organic compounds with liquid crystal properties act as electron donors.

A particularly suitable low molecular weight electron acceptor in the charge-transfer complexes according to the invention is 2,4,7-trinitrofluorenone. Another suitable electron acceptor is 2,4,7-trinitro-fluorenylidene-9-malononitrile.

Particularly preferred charge-transfer complexes according to the invention contain hexapentyloxytriphenylene as electron donor and 2,4,7-trinitrofluorenone as electron acceptor.

The low molecular weight or polymeric organic compounds present in the photoconductors according to the invention are known and can be prepared by conventional processes (cf., for example, Angewandte Chemie, 101 (1989) 934 and 102 (1990) 1525, where the preparation of polymers (A-1) to (A-5) is described).

The photoconductors according to the invention are usually used in the form of thin photoconducting layers, it also being possible to separate transport from generation of the charges by a two-layer arrangement as is used in electrophotography. In this case, the photoconductor according to the invention is located in the photoconducting charge-transport layer which is adjacent to any conventional sensitizer layer generating charge carriers. The charging in this case is usually effected by a high-voltage corona.

The layers according to the invention can be generated on a support surface by applying a melt or in a conventional manner, for example by applying a solution of the compounds by doctor knife. In this case it is possible to add various auxiliaries to the solution, for example to improve the leveling properties.

Examples of solvents used are tetrahydrofuran and dichloromethane.

These photoconducting layers generally have a thickness of from 2 to 100, preferably from 4 to 50 and particularly preferably from 4 to 30 μm.

The photoconductors or the photoconducting layers can be arranged between transparent substrates with a conducting coating, for which glass plates or plates made of optically transparent plastics (for example poly(methyl methacrylate), polycarbonate etc.) are used. The conducting coating of the substrate can be composed of electrically conducting polymers, semiconductors or metals. However, the thickness of this coating must be chosen so that the optical transmission is not too greatly impaired. Particularly advantageous coatings are composed of ITO (indium tin oxide).

To generate a photocurrent in this case, generally a DC voltage of from 5 to 50 V is applied to the plates with an electrically conducting coating.

The liquid crystal discotic state in which the photoconductivity is higher than in the unordered state is adjusted according to the invention. This can be carried out in a variety of ways. The orientation can be achieved, for example, mechanically (by stretching or shearing) or by electrical or magnetic fields. The adjustment of an orientation is also possible by means of orienting underlayers which contain or are composed of, for example, polyimides. The simplest way is by thermal treatment.

The photoconductors and photoconducting films according to the invention can be used in electrophotography, in laser printers, in offset printing or else in microelectronics for photosensitive switches.

It is furthermore possible for the invention to be employed in all areas where an increase in photoconductivity by molecular ordering can be utilized.

EXAMPLES

Examples 1 and 2 are examples of photoconductors according to the invention and of the process according to the invention for increasing the photoconductivity. Example 3 relates to the use in electrophotography.

The organic photoconductors were investigated in Examples 1 and 2 as follows.

The organic photoconductors were arranged between two transparent glass plates with electrically conducting coating in a glass measuring cell.

The space between the glass plates was adjusted to from 5 to 15 μm by spacers. A voltage was applied to the sample via the conducting layer, and the current was measured.

For the measurement the glass measuring cell with the sample layer to be investigated was placed on a heated microscope stage which could be heated at a constant rate from room temperature to 300° C. The cell was irradiated at right angles to the surface of the sample by a halogen lamp through a window about 5 mm in diameter in the cover of the heated stage (intensity about 0.02 watt/cm$^2$). The incident light beam was modulated by a chopper at a frequency of 10 Hz, i.e. 50 msec pulses of light were followed by equally long periods of dark.

The measuring cell was connected by two electrodes (transparent ITO electrodes) in series with a picoammeter to an adjustable voltage source which was used to apply a DC voltage of 10 V to the measuring cell. The picoammeter measured the electric current generated thereby through the sample, i.e. alternating with the frequency of the light modulation the dark current during the dark period, and the sum of the dark current and photocurrent during the light period.

The analog output signal from the picoammeter was passed to a lock-in amplifier which received its reference frequency from the chopper. The voltage contribution, which changed at the modulation frequency, to the picoammeter output was measured here. It was directly proportional to the difference between the cell current measured in the light and dark periods, and was thus proportional to the photocurrent.

For temperature-dependent measurement of the photocurrent, the measuring cell was heated at a rate of 5° C./min in the heated stage until the isotropic state was reached. During this temperature cycle the electronic measuring system described above was active. The measurements from the lock-in amplifier were read off the instrument as a function of temperature and converted to the units of the photocurrent.

EXAMPLE 1

2,3,6,7,10,11-Hexapentyloxytriphenylene (HPT) purified by recrystallization several times was inserted as a melt between the two transparent glass plates with an electrically conducting coating in the glass measuring cell (layer thickness: 8 μm), and the photocurrent was measured as described during heating to 125° C. The measurements are shown in the table.

TABLE

| Temperature [°C.] | Photocurrent [nA] |
| --- | --- |
| 45 | 0.5 |
| 50 | 0.5 |
| 55 | 0.5 |
| 60 | 0.5 |
| 65 | 1.4 |
| 70 | 4.6 |
| 75 | 4.5 |
| 80 | 5.1 |
| 85 | 6.4 |
| 90 | 7.8 |
| 95 | 9.1 |
| 100 | 10.8 |
| 105 | 12.2 |
| 110 | 13.4 |
| 115 | 14.4 |
| 120 | 17.0 |
| 125 | 2.7 |

As is evident from the table, the photocurrent is increased when the sample is in the discotic liquid crystal range, i.e. from 60 to 125° C. (maximum at 120° C.). The literature values for the phase transitions of HPT are 69° C. for the transition from the crystalline to the discotic state and 122° C. for the transition from the discotic to the isotropic state (cf. J. Billard, J. C. Dubois, Nguyen Huu Tinh, A. Zann, Nouveau Journal de Chimie, 2 (1978) 535.

EXAMPLE 2

HPT purified by recrystallization several times was dissolved in dichloromethane, and 1% by weight, based on the mixture, of 2,4,7-trinitrofluorenone (TNF) was added. The mixture was stirred for 10 minutes and then the solvent was evaporated off completely. The resulting mass was melted and then inserted as in Example 1 between two transparent glass plates with an electrically conducting coating (layer thickness: 5 μm). The phase transition temperatures were found to be 66.5° C. for the transition from the crystalline to the discotic state and 126° C. for the transition from the discotic to the isotropic state.

Measurements carried out in a similar manner to Example 1 produced a qualitatively similar result. The photoconduction in the discotic phase was distinctly higher than in the non-liquid-crystal phases.

EXAMPLE 3

Electrophotographic recording material

To produce a layer generating charge carriers, 5 g of the sensitizer N,N'-bis(2,6-dichlorophenyl)-perylene-3,4,9,10-tetracarboxylic diimide (cf. DE-A 31 10 955) were mixed with 3 g of a copolymer of vinyl chloride, acrylic acid and a maleic diester and 25 g of tetrahydrofuran and rolled in a bead mill for several hours. Then 75 g of tetrahydrofuran and 25 g of toluene were added. The mixture was homogenized in the bead mill for a further hour.

The resulting dispersion was applied with a doctor knife (slit 60 μm) to an untreated aluminum plate. The layer thickness after drying was about 0.8 μm.

The photoconductor layer was applied to this layer generating charge carriers. For this, a 15% by weight solution of a triphenylene-polysiloxane (with $C_{11}$ spacer, cf. W. Kreuder and H. Ringsdorf in Macromolecular Chemistry, Rapid Communications, 4 (1983) 4, and US-A 4,865,762) in tetrahydrofuran was prepared. The phase transition temperatures were −19° C. for the transition from the glassy state to the discotic state and 39° C. for the transition from the discotiC to the isotropic state. The solution was applied by a doctor knife (slit 150 μm) to the layer generating charge carriers. The layer thickness after drying was about 8 μm. To improve the orientation. in the layer, the plate was stored at 30° C. for several days.

The electrophotographic recording material produced in this way could be charged to a potential of −650 V in a conventional way using a high-voltage corona from a distance of 1 cm. It was then illuminated through a negative pattern to produce a latent charge image. Toner could be applied to this in a conventional manner. The powder image was then transferred to paper and fixed thereon. The transferred and fixed powder image reproduced the design of the negative pattern true to detail.

We claim:

1. A method of increasing the photoconductivity in photoconductors with liquid crystal properties, which consists essentially of increasing the photoconductivity by adjusting the discotic phase.
2. The method of claim 1, wherein the adjustment of the discotic phase is carried out by thermal treatment.
3. The method of claim 1, wherein the photoconductor with liquid crystal properties is triphenylene or a triphenylene derivative.
4. An electrophotographic recording material consisting essentially of an electrically conducting backing layer and a photoconducting layer, wherein the photoconducting layer is obtained by the method of claim 1.
5. An electrophotographic recording material consisting essentially of an electrically conducting backing layer, of a sensitizer layer generating charge carriers and a photoconducting layer, wherein the photoconducting layer is obtained by the method of claim 1.

* * * * *